United States Patent [19]
Wakana et al.

[11] Patent Number: 6,085,858
[45] Date of Patent: Jul. 11, 2000

[54] SUSPENSION ASSEMBLY FOR AUTOMOTIVE ENGINE

[75] Inventors: Akira Wakana; Tadashi Kimura; Naoto Hirasaka, all of Susono, Japan

[73] Assignee: Toyota Jidosha Kabushiki Kaisha, Toyota, Japan

[21] Appl. No.: 09/094,778

[22] Filed: Jun. 15, 1998

[30] Foreign Application Priority Data

Jun. 20, 1997 [JP] Japan .................................. 9-164749

[51] Int. Cl.[7] ....................................................... B60K 5/00
[52] U.S. Cl. ........................................... 180/300; 180/291
[58] Field of Search ..................................... 180/291, 299, 180/300, 58; 280/781; 267/136, 140.5, 140.11, 141

[56] References Cited

U.S. PATENT DOCUMENTS

| | | | |
|---|---|---|---|
| 4,240,517 | 12/1980 | Harlow, Jr. et al. | 180/295 |
| 4,467,992 | 8/1984 | Morimura et al. | 248/659 |
| 4,560,027 | 12/1985 | Murakami et al. | 180/312 |
| 4,564,082 | 1/1986 | Takehara et al. | 180/312 |
| 4,667,764 | 5/1987 | Sawada et al. | 180/297 |
| 4,881,712 | 11/1989 | Lun | 248/562 |
| 4,901,814 | 2/1990 | Van Broock et al. | 180/297 |
| 5,042,321 | 8/1991 | Hongo et al. | 74/606 R |
| 5,074,374 | 12/1991 | Ohtake et al. | 180/312 |
| 5,129,479 | 7/1992 | Fujii et al. | 180/297 |
| 5,133,427 | 7/1992 | Arvidsson et al. | 180/297 |
| 5,230,401 | 7/1993 | Kameda et al. | 180/297 |
| 5,251,720 | 10/1993 | Hasetoh et al. | 180/297 |
| 5,273,261 | 12/1993 | Hamberg et al. | 267/140.12 |
| 5,454,443 | 10/1995 | Fischle et al. | 180/312 |

OTHER PUBLICATIONS

Japanese Utility Model Laid–Open Publication No. 63–65524, Engine Supporting Device in a Vehicle, Apr. 30, 1998.

Japanese Patent Office, Patent Abstract, Engine Supporting Device, Publication No. 08310438 A, Publication Date Nov. 26, 1996.

*Primary Examiner*—Eric Culbreth
*Assistant Examiner*—L. Lum
*Attorney, Agent, or Firm*—Kenyon & Kenyon

[57] ABSTRACT

In a suspension assembly for an automotive engine of a front-engine/front-drive vehicle and for supporting the engine to a frame by an engine mount, an arrangement position of the engine mount in the vehicle is in the range between a vertical plane including an inertia main axis in a rolling direction of the engine and a vertical plane including a centerline of a drive shaft. Then, the vertical plane including the inertia main shaft is not included in the range and the vertical plane including the centerline of the drive shaft is included in the range. Thus, the arrangement position of the engine mount may be set in consideration of all of the idle vibration property, the drivability and the degree of freedom of design.

2 Claims, 12 Drawing Sheets

RANGE IN WHICH ROLLING AXIS IS SHIFTED

RANGE IN WHICH ROLLING AXIS IS SHIFTED

VIBRATION MODE OF BODY FRAME

SKELETON OF BODY FAME

PITCHING ROTATIONAL DIRECTION

SUSPENSION ASSEMBLY FOR AUTOMOTIVE ENGINE

BACKGROUND OF THE INVENTION

1. Field of the Invention

The present invention relates to a suspension assembly for an automotive engine, and more particularly to a suspension assembly for an automotive engine of a front-engine and front-drive type vehicle in which automotive engines are arranged in a horizontal direction with respect to the longitudinal direction of the vehicle.

2. Description of the Related Art

In general, in an engine mounting vehicle, a sub-frame is mounted through body mounts onto a body frame. Then, an engine is supported to the body frame by engine mounts mounted on this sub-frame.

FIGS. 15 and 16 show an example of conventional general engine mounts for mounting an engine in the horizontal direction with respect to the longitudinal direction of the vehicle which is a so-called FF vehicle. In FIGS. 15 and 16, character Fr denotes a front side direction of the vehicle, character RH denotes a right hand direction of the vehicle, character UP denotes an upward direction of the vehicle and character Ge denotes a center of gravity of the engine 13. Incidentally, these characters are used in the same meaning also in the other drawings.

The sub-frame 11 is supported at its four corners through the body mounts 12 to the body frame (not shown). Then, the engine 13 is arranged in the horizontal direction in the central portion of the sub-frame 11 in the longitudinal direction. Engine mounts 14a and 14b for supporting a static load of the engine 13 are arranged respectively on a front cross member 11a and a rear cross member 11b in the vicinity of one body mount 12 of each cross members 11a and 11b. Incidentally, there are some cases where the engine mounts 14a and 14b are a left side rail 11c and a right side rail 11d of the sub-frame 11, respectively. Also, in these cases, the engine mounts 14a and 14b are arranged respectively in the vicinity of one body mount 12 of each side rail 11c and 11d.

In case the engine mounts 14a and 14b are mounted so that they are kept in the condition that they are located in the vicinity of each body mount 12 respectively, both the "idle vibration property" and the "drivability" would become worse. The "idle vibration property" represents how less the sympathetic vibration of the vehicle is caused by vibration during the idle speed of the engine. If the idle vibration property is superior, the frames hardly vibrates, whereas if the idle vibration property is inferior, the frames are liable to resonates. Also, the "drivability" means that the frames are shifted relative to the torque variation of the engine. If the drivability is inferior, the passenger is subjected to a considerably shock during the torque variation, whereas if the drivability is superior, the shock feeling would be weak.

The idle vibration property and the drivability in the arrangement of the conventional engine mounts will now be described in detail.

When the engine 13 takes an idle rotation, the engine 13 is vibrated in a rolling direction about an inertia main axis I. The inertia main axis I is hereinafter referred to as a rolling inertia main axis I. The vibration which occers at the time when the engine 13 takes the idle rotation is a so-called idle vibration. Generally the rolling inertia main axis I means that an axis, when a rigid member is revolved about the axis, in which any moment for changing the direction of the axis as viewed in a coordinate which revolves together with the rigid member is not generated and is an intrinsic axis to the engine.

By the way, the vibration mode of the body frame upon the idle vibration is a two-node bending mode as indicated by a solid line in FIG. 17. Accordingly, the body frame has a high sensitivity relative to the vibration input in the vertical direction. Incidentally, the vibration mode is depicted in the drawing in an exaggerated manner to some degree. Also, a broken line in FIG. 17 shows a skeleton of the body frame when the engine stops.

If the engine mounts 14a and 14b are mounted on the cross members 11a and 11 respectively so that they are kept in the condition that they are located in the vicinity of each body mount 12 as described above, since the engine mounts 14a and 14b are remote from the rolling inertia main axis I of the engine 13, the idle vibration is introduced into the engine mounts 14a and 14b in the vertical direction. The vertical vibration input is attenuated by the engine mounts 14a and 14b and the body mounts 12. However, although the input would be attenuated, the idle vibration is transmitted as the vertical vibration input from the engine mounts 14a and 14b to the body frame through the sub-frame 11 and the body mounts 12. Accordingly, the idle vibration property is inferior.

On the other hand, a torque repulsive force is applied to the engine 13 upon the acceleration/deceleration of the vehicle. For this reason, the engine 13 is subjected to the torque in the rolling direction about a rolling axis R (see FIG. 18). In this case, the rolling axis R means a rotary centerline of the engine which is liable to rotate by the torque repulsive force generated in the engine upon the acceleration/deceleration of the vehicle. The rotation of the engine 13 about the rolling axis R is referred to as a rolling rotation.

If, as shown by a thin line in FIG. 18, the engine 13 is rolled on the rear side of the vehicle upon the acceleration, then the rotational torque is transmitted to the engine mount 14b, and thereafter, the rotational torque is transmitted to the body frame through the sub-frame 11 and the body mounts 12 from the engine mount 14b. As a result, the vehicle 20 is sunk downwardly and simultaneously rotatively pitched toward the front side of the vehicle 20 about the center G of gravity of the vehicle 20. Thus, the vehicle is shifted as indicated by a thin line in FIG. 18. Then, a head portion 21 of the passenger in the vehicle 20 is moved from the position indicated by a solid line to the position indicated by a thin line, the passenger feels a shock.

The reason why the vehicle 20 is rotatively pitched is that a normal plane in the engine mount 14b relative to a working line of the force F applied to the engine mount 14b due to the rolling motion of the engine 13, that is, a line connecting the rolling axis R and the engine mount 14b does not pass through the gravity center G of the vehicle 20. Then, the remoter the working line (normal plane) from the gravity center G, the larger the pitching rotational force will become.

Namely, in the arrangement of the above-described conventional engine mounts 14a and 14b, the distance between the above-described working line (normal plane) and the gravity center G of the vehicle 20 is increased so that the shock feeling upon the acceleration/deceleration is very large and the drivability becomes worse.

If, as shown in FIG. 19, the working line (normal plane) of the force F applied to the engine mount 14b passes through the gravity center G of the vehicle 20, the force of the pitching rotation is not applied to the vehicle 20. Accordingly, the vehicle 20 is only sunk downwardly as shown by the thin line in FIG. 19. Therefore, the head portion 21 of the passenger is not greatly shifted, thereby decreasing a shock that the passenger might feel.

Thus, it is necessary to improve the suspension assembly of the vehicle engine and there have been proposed a variety of inventions and devices.

For example, Japanese Utility Model Application Laid-Open No. Sho. 63-65524 discloses a suspension assembly in which the engine mounts are disposed just below the rolling inertia main axis I of the engine. In this suspension assembly, the direction of the vibration input into the engine mounts upon the idle vibration is the longitudinal direction of the vehicle without directing the direction of the vibration input in the vertical direction of the vehicle, thereby improving the idle vibration property.

However, in the suspension assembly disclosed in that publication, the arrangement of the engine mounts has no sufficient degree of freedom. Also, the degree of freedom of design of the overall vehicle is restricted. Moreover, in the arrangement, the drivability is not taken into consideration.

Japanese Patent Application Laid-Open No. Hei. 8-310438 discloses a suspension assembly having a stop mechanism for suppressing the introduction of the vibration force generated by the torque repulsive force of the engine upon the acceleration/deceleration of the vehicle into the vehicle in the vertical direction so that the vibration force is introduced into the horizontal direction.

However, in the suspension assembly disclosed in that publication, although it is possible to slightly improve the drivability but the stop mechanism is very complicated and in addition, it is necessary to provide a space for the stop mechanism. Also, in this suspension device, the engine mounts are remote from the rolling inertia axis I as in the conventional examples. Namely, there is no consideration of the idle vibration property.

SUMMARY OF THE INVENTION

The present invention has been made in view of the foregoing defects inherent in the prior art, and an object of the present invention is, therefore, to balance an idle vibration property, a drivability and a degree of freedom of design by limiting an arrangement position of engine mounts.

The following means is adopted in order to solve the above-described problems.

A suspension assembly for an automotive engine of a front-engine/front-drive vehicle and for supporting the engine to a frame by an engine mount is characterized in that: an arrangement position of the engine mount in the vehicle is in the range between a vertical plane including an inertia main axis in a rolling direction of the engine and a vertical plane including a centerline of a drive shaft; the vertical plane including the inertia main axis is not included in the range; and the vertical plane including the centerline of the drive shaft is included in the range.

When the engine is rolled by a torque repulsive force, a rolling axis is shifted between a resilient main axis and a centerline of drive shaft in response to a magnitude of the torque generated in the engine.

If the position of the engine mount in the vehicle is arranged in the range between a vertical plane including an inertia main axis in a rolling direction of the engine and a vertical plane including a centerline of a drive shaft, in which there is included the vertical plane including the centerline of the drive shaft on the drive shaft side with respect to the vertical plane including an inertia main axis in a rolling direction of the engine, it is possible to keep both the idle vibration property and the drivability in a good condition to some extent.

Since it is possible to set the arrangement position of the engine mount in a predetermined range, it is possible to enhance a degree of freedom of design.

The position of the engine mount is referenced by a support point (mount center) of the engine mount.

Also, in the case where the above-described engine mount for supporting the static load of the engine is disposed in the vicinity of the vertical plane including the centerline of the drive shaft, it is possible to more enhance the drivability when the large torque is generated in the engine.

BRIEF DESCRIPTION OF THE DRAWINGS

The objects and features of the present invention will become more apparent from the consideration of the following detailed description taken in conjunction with the accompanying drawings in which.

DETAILED DESCRIPTION OF THE PREFERRED EMBODIMENTS

An embodiment of the present invention will now be described with reference to the accompanying drawings.

An object of the present invention is to limit a range of the arrangement position of engine mounts in view of the relationship among the idle vibration, the drivability and the design freedom degree in an FF vehicle in which the engines are arranged horizontally. Accordingly, the idle vibration property aspect and the drivability aspect will separately be described with respect to the best arrangement position of the engine mounts.

<Idle Vibration Property>

In general, as described in conjunction with the prior art, the body frame of the vehicle has a high sensitivity relative to the vertical vibration input. Accordingly, in order to make it difficult to resonate with the idle vibration of the engine, it is sufficient to make it difficult to introduce the vibration input in the vertical direction into the body frame upon the idle vibration.

Figure 1:
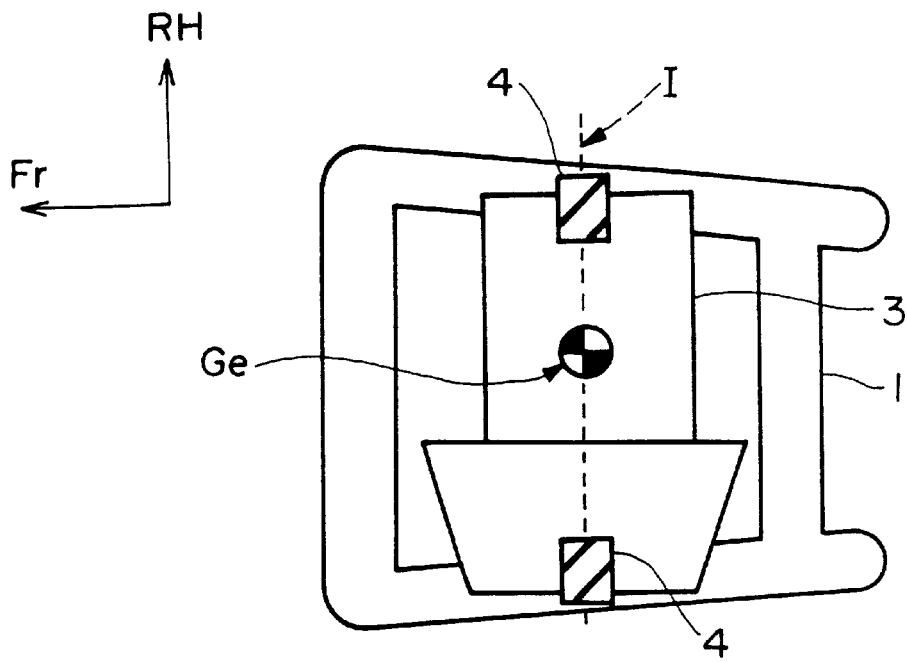
FIG. 1 is a plan view showing the best arrangement position of the engine mount relative to the idle vibration property.
Figure 2:
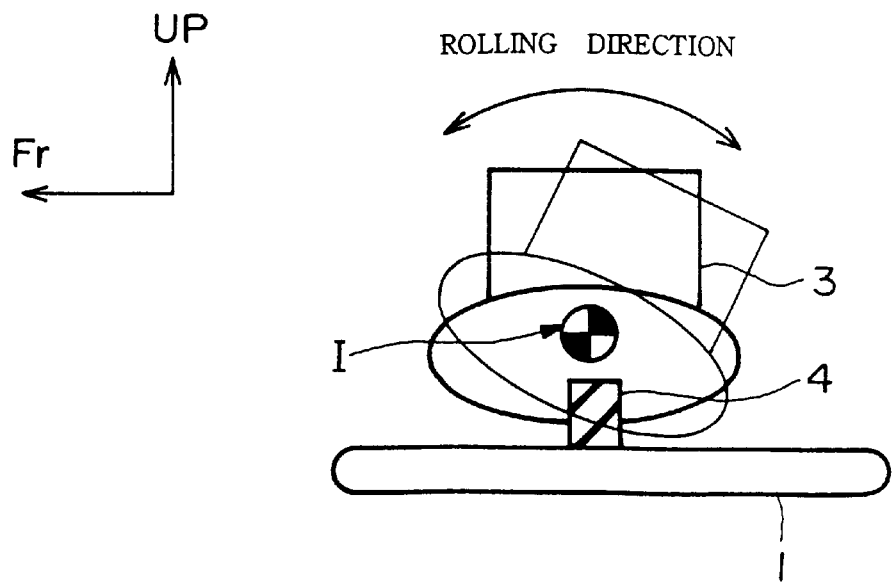
FIG. 2 is a side elevational view showing the best arrangement position of the engine mount relative to the idle vibration property.

In order to attain this, as shown in FIGS. 1 and 2, it is sufficient to dispose engine mounts 4 for supporting a static load of an engine 3 on a vertical plane including a rolling inertia main axis I of the engine 3. With such an arrangement, when the engine 3 is rolled in the rolling direction about the rolling inertia main axis I upon the idle operation, the vibration input is not introduced in the vertical direction into the engine mounts 4 and the vibration input in the longitudinal direction of the vehicle is inputted. Incidentally, in FIGS. 1 and 2, reference numeral 1 denotes a sub-frame.

Accordingly, only in view of the idle vibration property, it is best that the engine mounts 4 are arranged on the vertical plane including the rolling inertia main axis I of the engine 3. Then, in this case, there is an advantage that it is easy to enhance the spring property in the vertical direction of the engine mounts 4, more exactly, to enhance the driving feeling by enhancing the rubber property of the mount rubber (not shown) which is a dampening rubber for the engine mounts 4.

<Drivability>

Figure 18:
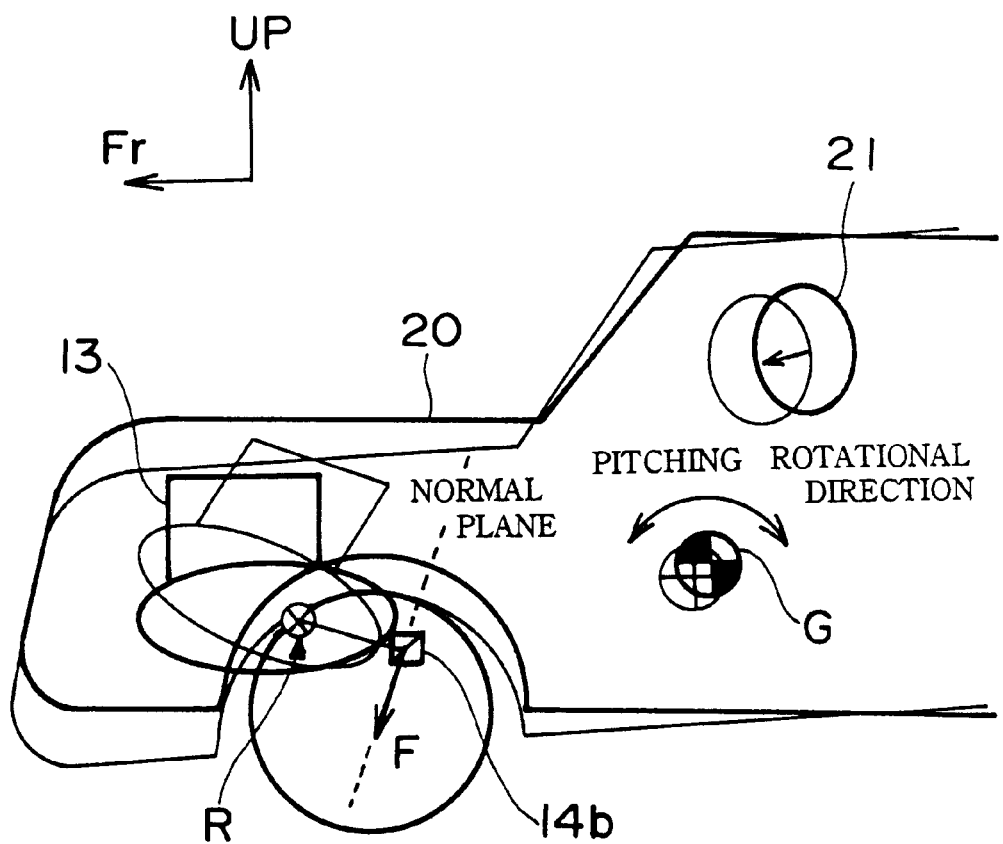
FIG. 18 is a side elevational view showing a state in which the vehicle is rotatively pitched due to the roll of the engine.
Figure 19:
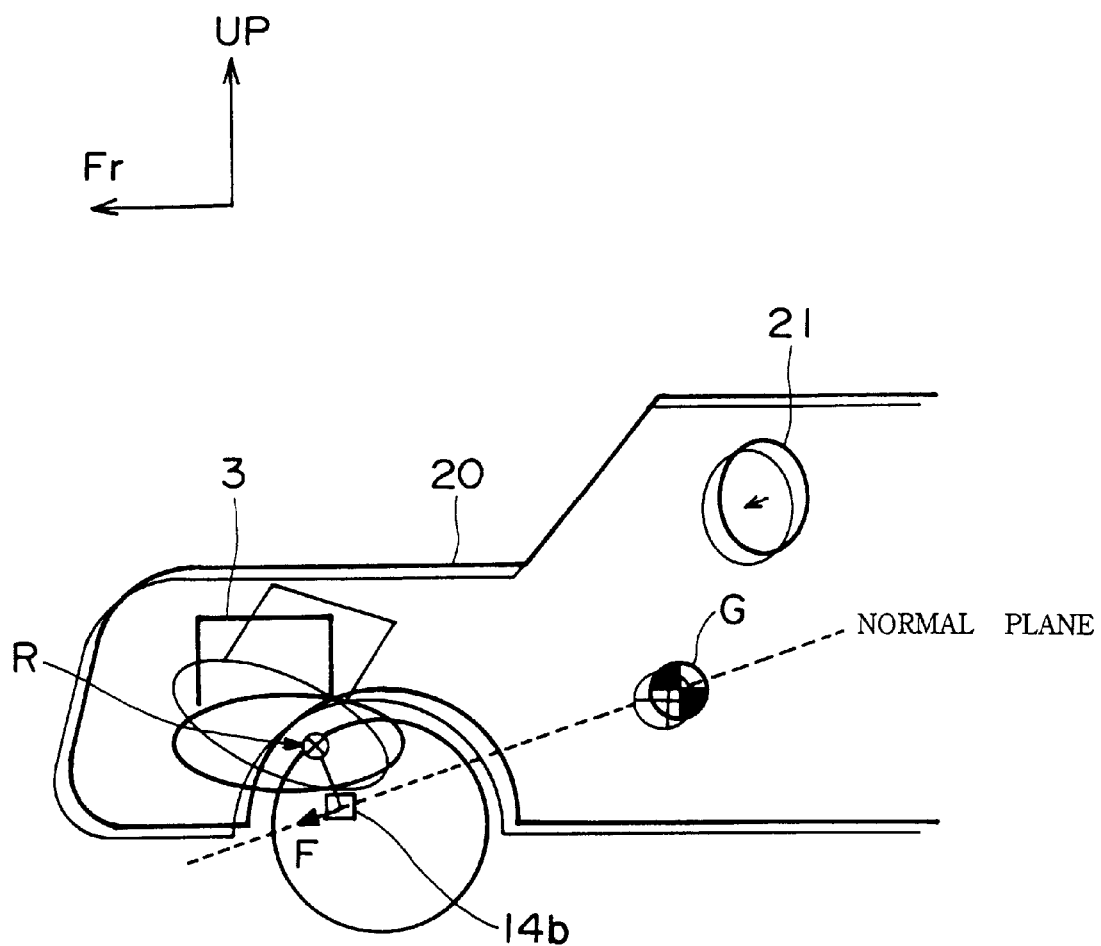
FIG. 19 is a side elevational view showing a case where the vehicle is not rotatively pitched even if the engine is rolled.

The torque repulsive force is applied to the engine upon the acceleration/deceleration of the vehicle as described in conjunction with FIG. 18 which is an illustration of the prior art. For this reason, the engine is rolled about the rolling axis R as shown in FIG. 18. Due to this, the vehicle is sunk downwardly and would be rotatively pitched about the gravity center G of the vehicle.

By the way, a crankshaft that is an output shaft of the engine is connected to right and left drive shafts through a clutch, a transmission and a differential gear train. Also, wheels are coupled with ends of the right and left drive shafts through an equal velocity joint. As is well known, the equal velocity joint is structured so that it only transmits the torque of the drive shaft to wheels but does not transmit the parallel direction force. Accordingly, normally, it is possible to shift the drive shafts in the parallel direction relative to the frame.

Thus, in the case where the drive shafts are thus movable in the parallel direction relative to the frame as desired, the rolling axis R is identified with a resilient main axis E of the suspension assembly for supporting the engine when the engine rolls.

In this case, in general, the resilient main axis E means an axis in which a direction of a force that is applied along a specific axis to a spring unit (suspension assembly) is identified with a direction of spring shift of the spring unit and any angular shift is not generated. The resilient main shaft E is related to an arrangement of the spring and a strength of the spring but has nothing to do with a mass system nor the gravity center.

Figure 3:
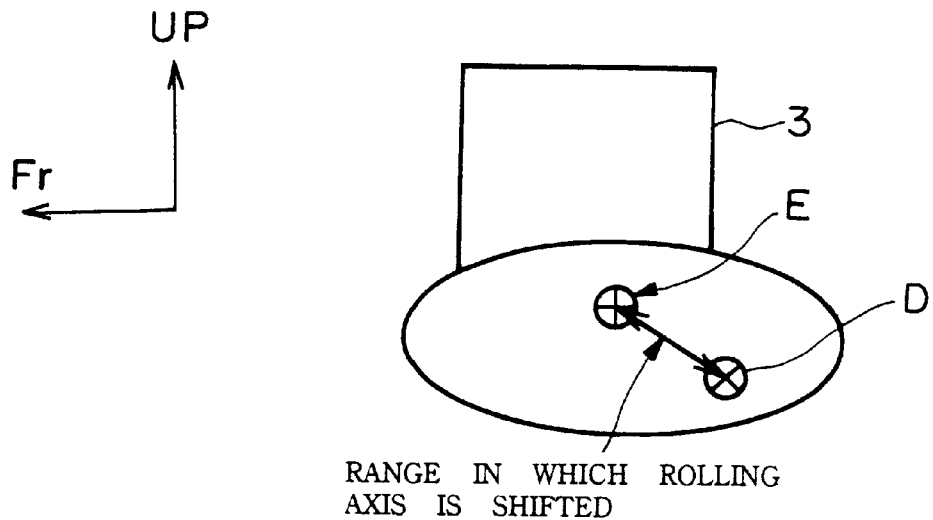
FIG. 3 is a side elevational view showing a range in which the rolling axis is shifted in the case where the drive shaft D is located on the rear side of the resilient main axis E.
Figure 4:
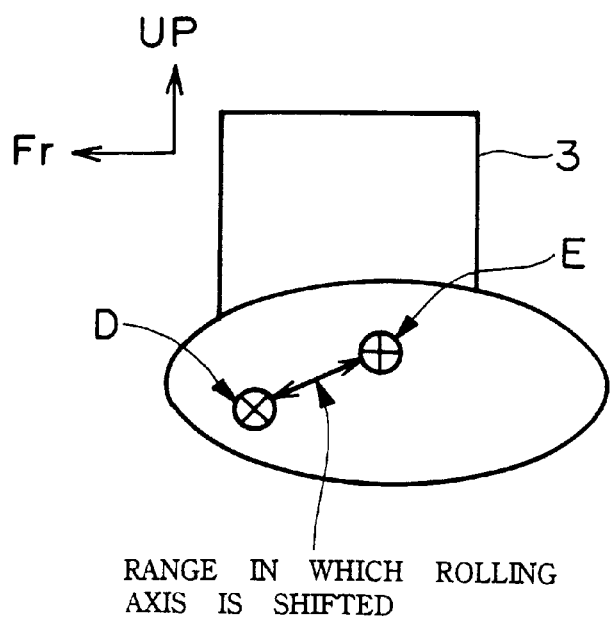
FIG. 4 is a side elevational view showing a range in which the rolling axis is shifted in the case where the drive shaft D is located on the front side of the resilient main axis E.

However, in the case where a large torque is generated in the engine as upon the abrupt acceleration/deceleration of the vehicle, the equal velocity joint is locked so that the drive shafts are not moved in the parallel direction relative to the vehicle. For this reason, the engine is rolled about the rolling axis R using a centerline D of each drive shaft as a center. From this, it is possible to infer that the engine rolling axis R is not fixed and would be shifted between the resilient main axis E and the centerline D of each drive shaft in accordance with the torque generated in the engine as shown in FIGS. 3 and 4. Incidentally, FIG. 3 shows the case where the drive shafts D are arranged on the rear side of the resilient main axis E and FIG. 4 shows the case where the drive shafts D are arranged on the front side of the resilient main axis E.

Figure 5:
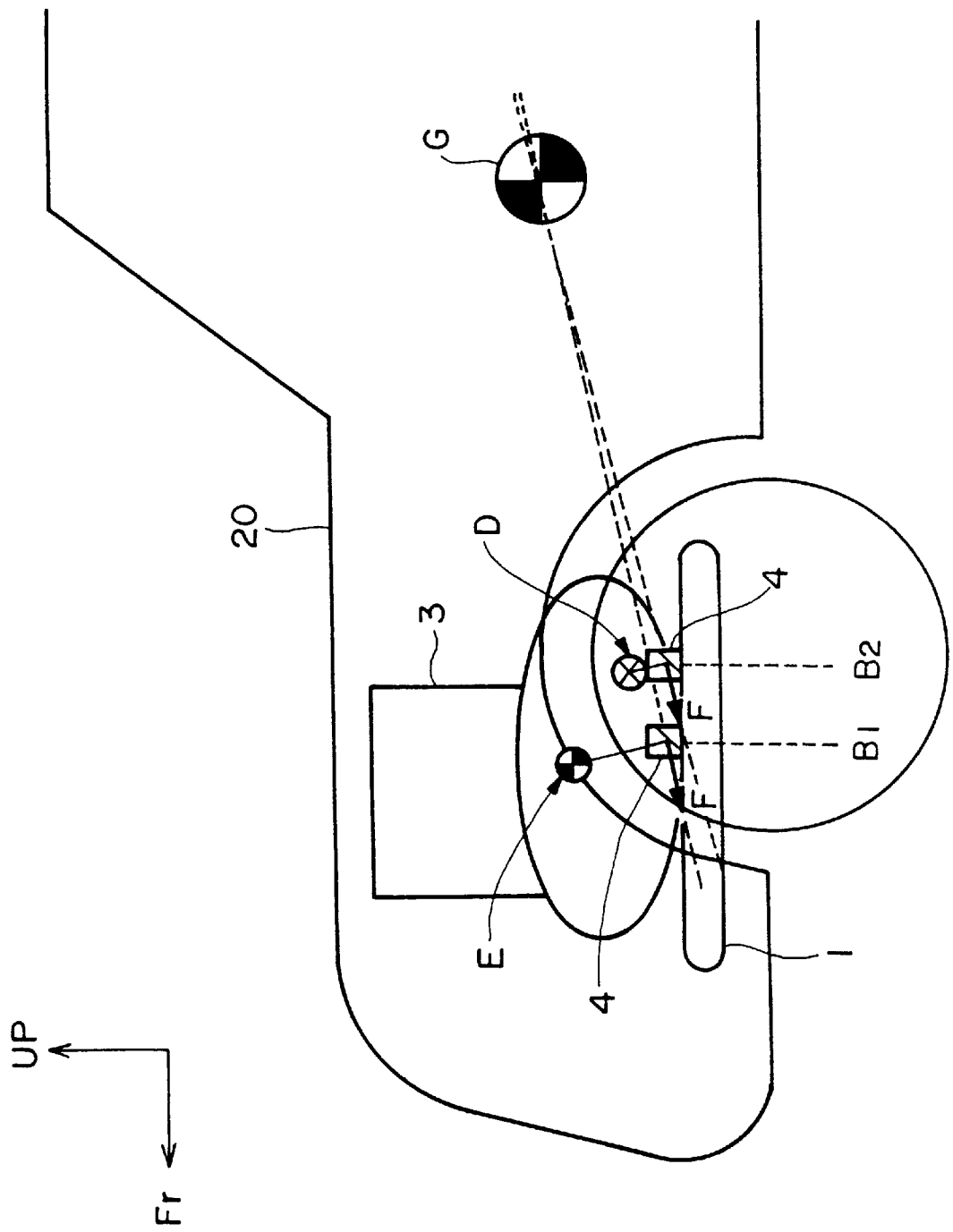
FIG. 5 is a side elevational view showing the best arrangement position of the engine mount at the shift limit in the case where the rolling axis is shifted in the case where the drive shaft D is located on the rear side of the resilient main axis E.
Figure 6:
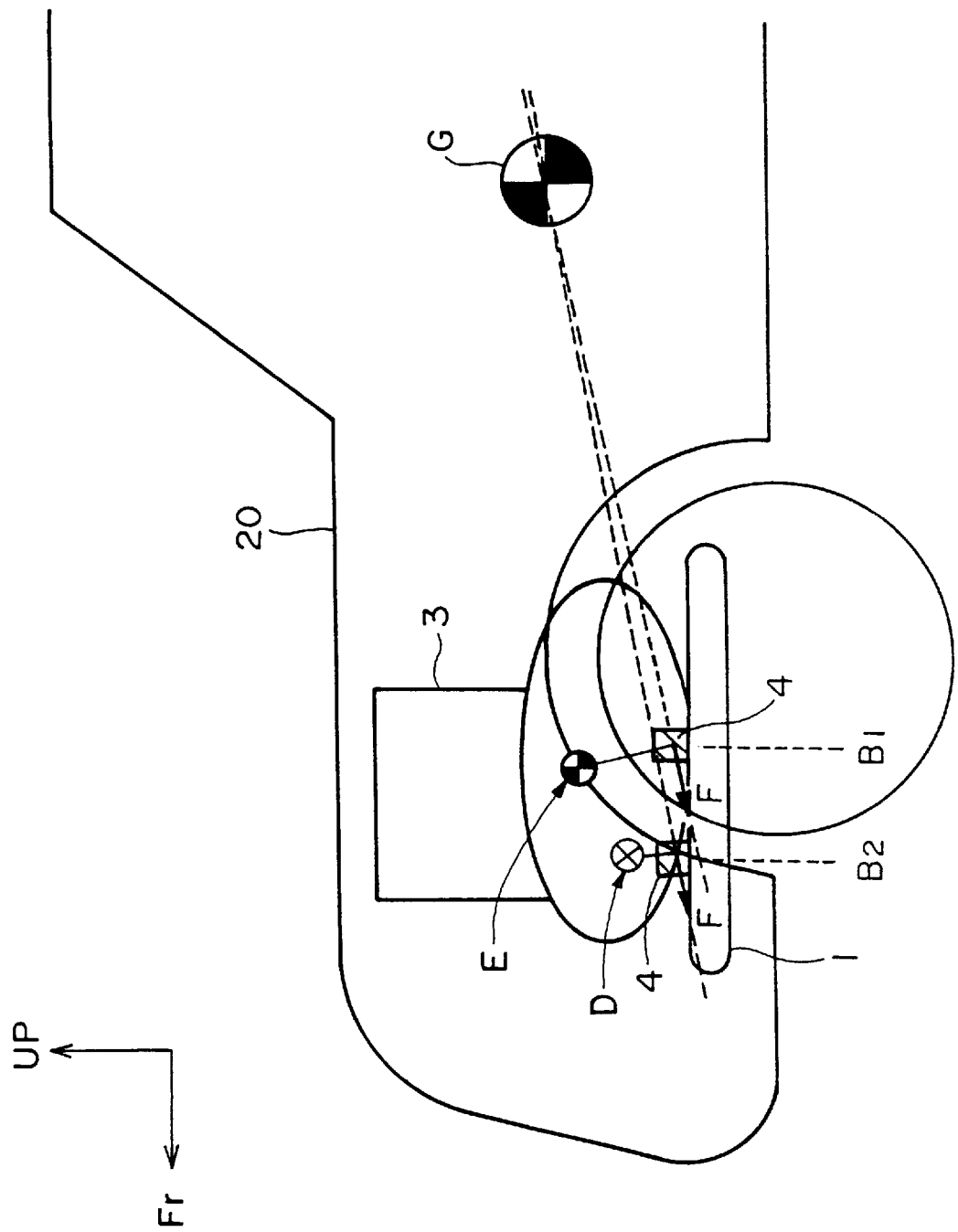
FIG. 6 is a side elevational view showing the best arrangement position of the engine mount at the shift limit in the case where the rolling axis is shifted in the case where the drive shaft D is located on the front side of the resilient main axis E.

As described above, in order to prevent the vehicle caused by the rolling motion of the engine from pitching, it is sufficient to dispose the engine mount so that a normal plane in the engine mount relative to a working line of the force applied to the engine mount due to the rolling motion of the engine, that is, a line connecting the rolling axis R and the engine mount does pass through the gravity center G of the vehicle. If the best arrangement position of the engine mounts is sought in the case where the rolling axis R is identified with the resilient main axis E or the centerline D of each drive shaft, such arrangement is shown in FIG. 5 or FIG. 6. FIG. 5 shows the case where the drive shaft D is located on the rear side of the resilient main axis E and FIG. 6 shows the case where the drive shaft D is located on the front side of the resilient main axis E.

Namely, in view of the drivability aspect of the vehicle, in the case where the rolling axis R is identified with the resilient main axis E, it is the best to dispose the engine mounts 4 at a point B1 slightly on the rear side along the longitudinal direction of the vehicle 20 after the resilient main axis E. Also, in the case where the rolling axis R is identified with the centerline D of the drive shaft, it is the best to dispose the engine mounts 4 at a point B2 slightly on the rear side along the longitudinal direction of the vehicle 20 viewed from the centerline D of the drive shaft.

Accordingly, even if the rolling axis R is shifted between the resilient main axis E and the centerline D of the drive shaft, the best arrangement position of the engine mount 4 for the drivability is present between the point B1 and the point B2. In other words, as long as the rolling axis R is shifted and the engine mount 4 is located at a constant position, even if the engine mount 4 is located at any point between the point B1 and the point B2, the constant position is not always the best arrangement position relative to the drivability. However, only if the engine mount 4 is disposed at least between the point B1 and the point B2, there is always a case where the pitching motion of the vehicle 20 may be prevented. Also, there is no fear that the drivability would become worse.

Figure 7:
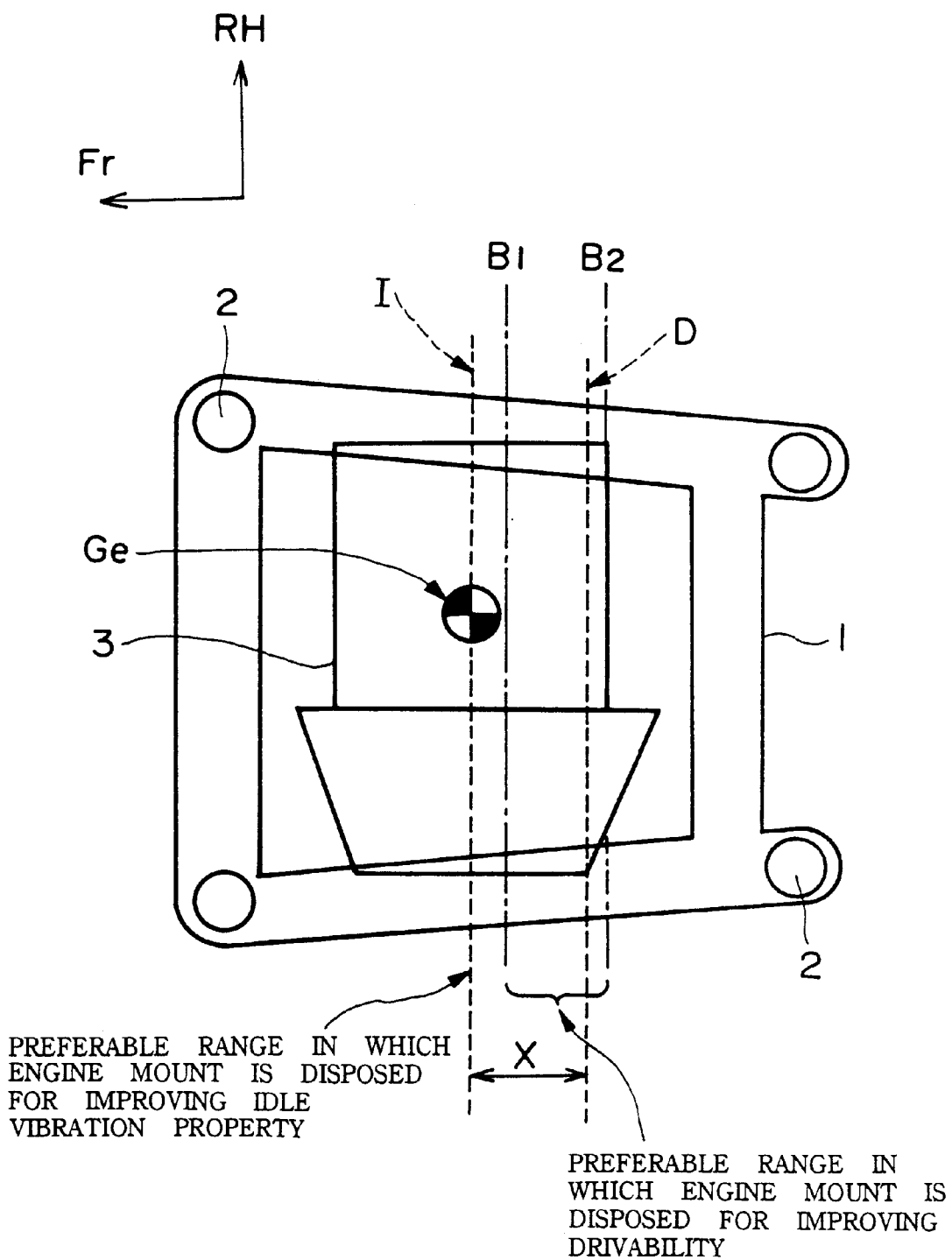
FIG. 7 is a plan view showing a range of the best arrangement position of the engine mount in view of the idle vibration property and the drivability in the case where the drive shaft D is located on the rear side of the resilient main axis E.
Figure 8:
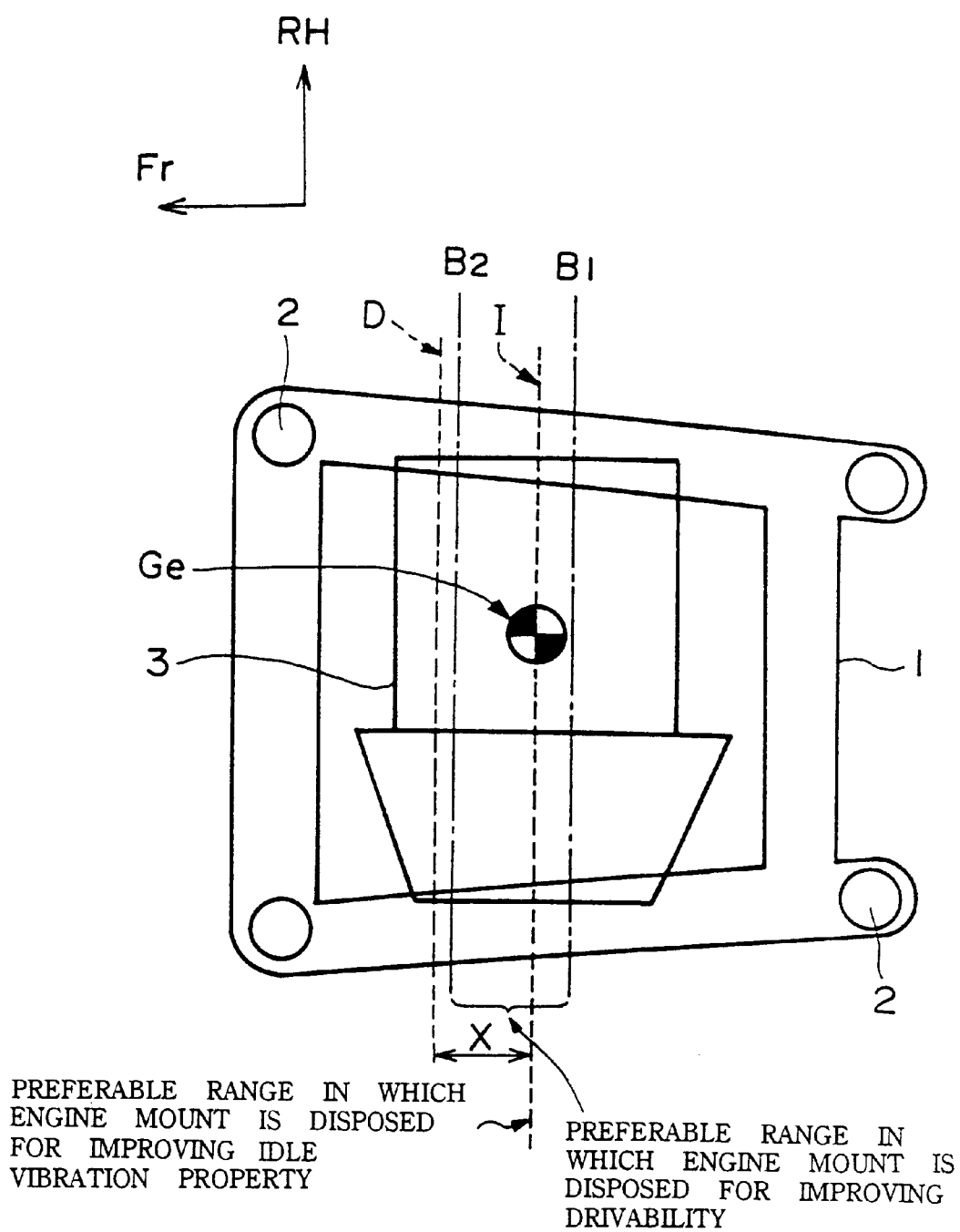
FIG. 8 is a plan view showing a range of the best arrangement position of the engine mount in view of the idle vibration property and the drivability in the case where the drive shaft D is located on the front side of the resilient main axis E.

FIGS. 7 and 8 show an essence of the best arrangement position (range) of the engine mount in a plan view from the view of the idle vibration property and the drivability.

FIG. 7 shows an arrangement in which the drive shaft D is disposed on the rear side of the vehicle with respect to the resilient main axis E. In this case, as is apparent from FIG. 7, the best arrangement position of the engine mount relative to the idle vibration property (position where the engine mount should be located also in view of the improvement in the idle vibration property) is deviated from the arrangement position range of the engine mount best for the drivability. Accordingly, it is impossible to simultaneously meet both the idle vibration property and drivability. However, if the engine mount is disposed on the side of the drive shaft side with respect to the vertical plane including the rolling inertia main axis I and in the range including the vertical plane including the centerline D of the drive shaft, it is possible to good idle vibration property and drivability to some extent.

Also, FIG. 8 shows a case where the drive shaft D is disposed on the front side of the vehicle with respect to the resilient main axis E. In this case, as is apparent from FIG. 8, the best engine mount arrangement position relative to the idle vibration property (the position where the engine mount should be arranged also in order to improve the idle vibration property) is present in the arrangement position range of the best engine mount relative to the drivability. However, also in this case, if the engine mount is disposed in the range, including the vertical surface including the centerline D of the drive shaft, on the drive shaft side with respect to the vertical plane including the rolling inertia main axis I, it is possible to obtain good idle vibration property and drivability to some extent.

Namely, it is safe to say that the range, including the vertical plane including the centerline D of the drive shaft, on the drive shaft side with respect to the vertical plane including the rolling inertia main axis I is an allowable range X which enables keeping good both idle vibration property and drivability to some extent, irrespective of the positional relationship between the drive shaft and the resilient main axis E. Then, if the arrangement position of the engine mount is determined within the above-described range X in view of the engine and the sub-frame and a variety of equipment and components to be arranged around the engine and the sub-frame, it is possible to enhance the degree of freedom of design.

A specific arrangement of engine mounts will now be described.

<First Embodiment>

Figure 9:
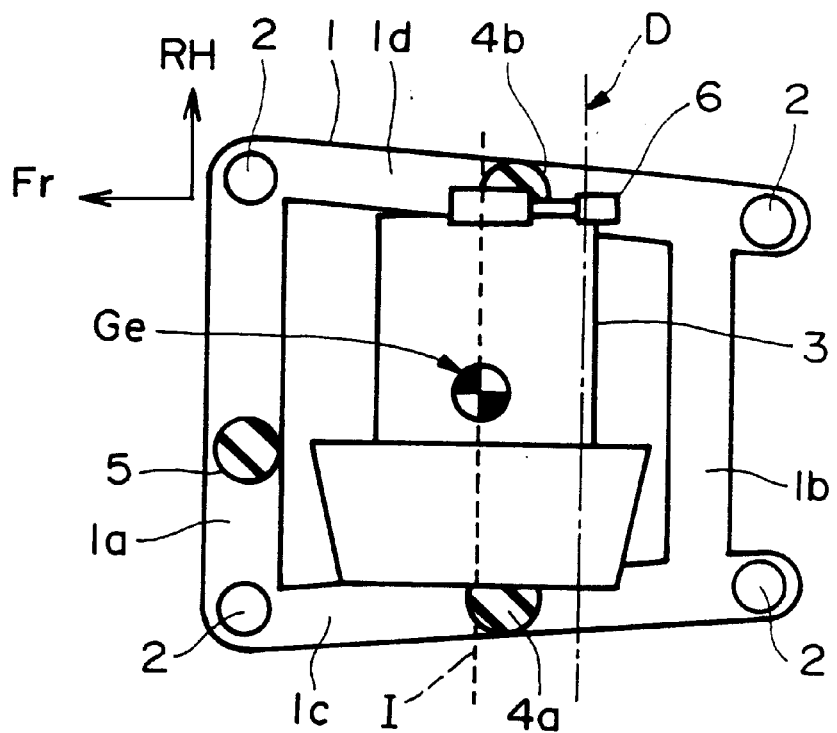
FIG. 9 is a plan view showing a suspension assembly for an automotive engine in accordance with a first embodiment of the invention.
Figure 10:
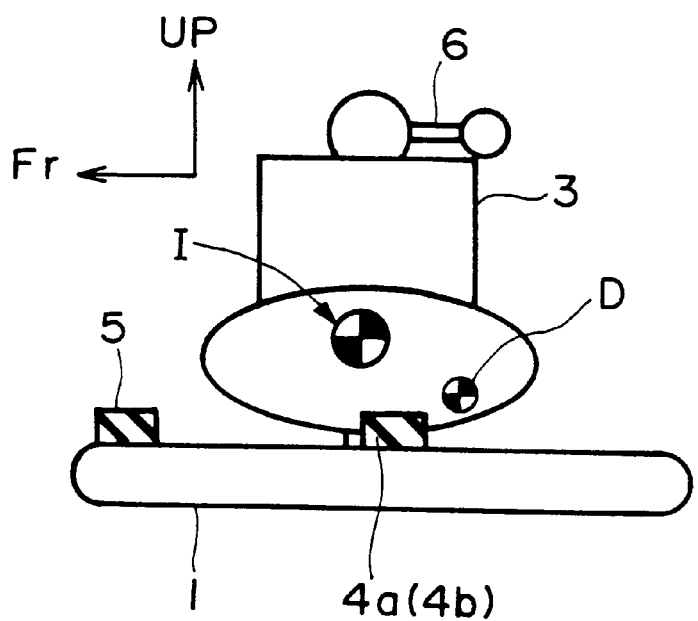
FIG. 10 is a side elevational view showing the suspension assembly for an automotive engine in accordance with the first embodiment of the invention.

An embodiment shown in FIGS. 9 and 10 is an example in which, in the case where a drive shaft D is located on the rear side of the vehicle after a resilient main axis E, engine mounts for supporting a static load of an engine are disposed in the vicinity of a vertical plane including a rolling inertia main axis I.

A sub-frame 1 is constituted in the form of a rectangular shape by a front cross member 1a, a rear cross member 1b, a left side rail 1c and a right side rail 1d. Then, the sub-frame 1 is supported to a body frame (not shown) through body mounts 2 at its four corners. Also, an engine 3 is disposed in a central portion in a longitudinal direction of the sub-frame 1. Incidentally, in this embodiment, the sub-frame 1 constitutes a part of the frame as opposed to the body.

A left main engine mount 4a and a right main engine mount 4b for supporting the static load of the engine 3 are disposed on a left side rail 1c and a right side rail 1d, respectively. Support points (mount centers) of these left and right main engine mounts 4a and 4b are positioned slightly on the rear side in the longitudinal direction of the vehicle after the vertical plane including the rolling inertia main axis I of the engine 3. Also, a front engine mount 5 for preventing the engine 3 from slanting forwardly is disposed upon the front cross member 1a. The front engine mount 5 is coupled with a front portion of the engine 3 through a bracket.

The front engine mount 5 is a necessary component because the left and right main engine mounts 4a and 4b are away from the vertical plane including the rolling inertia main axis I. However, since almost all the static load of the engine 3 is applied to the main engine mounts 4a and 4b, the static load of the engine 3 to be shared for the front engine mount 5 is very small. Accordingly, it is possible to suppress and reduce a spring constant in the vertical direction of the front engine mount 5. There is a small possibility that the front engine mount 5 adversely affects the idle vibration property and the drivability.

The engine 3 is coupled with the above-described body frame through a torque rod 6 at its upper portion. Then, the back-and-forth movement of the engine 3 is restricted by the torque rod 6.

<Second Embodiment>

Figure 11:
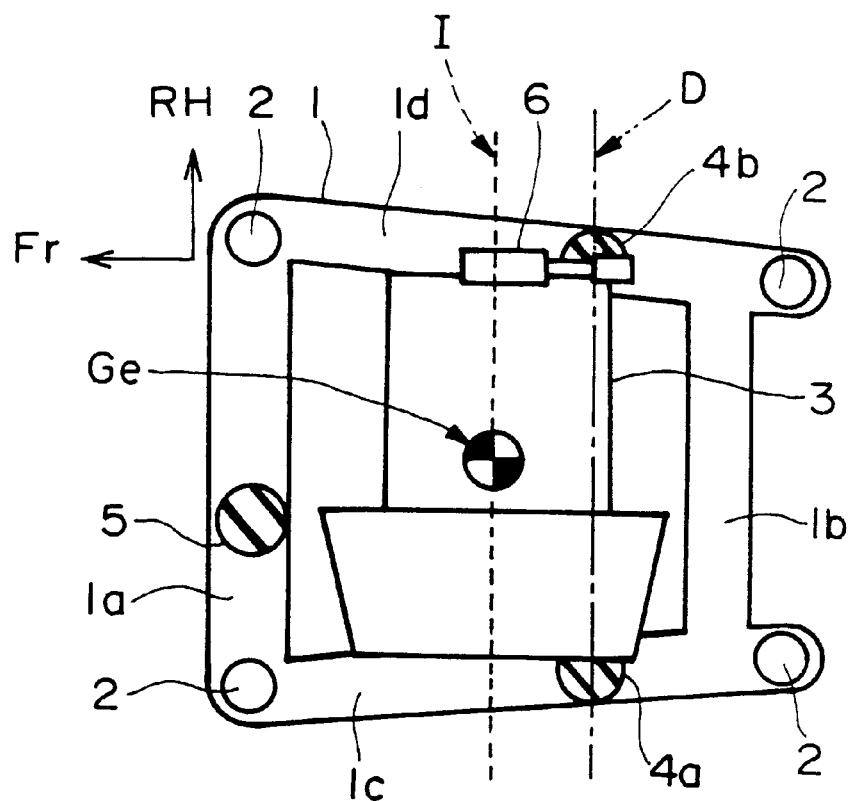
FIG. 11 is a plan view showing a suspension assembly for an automotive engine in accordance with a second embodiment of the invention.
Figure 12:
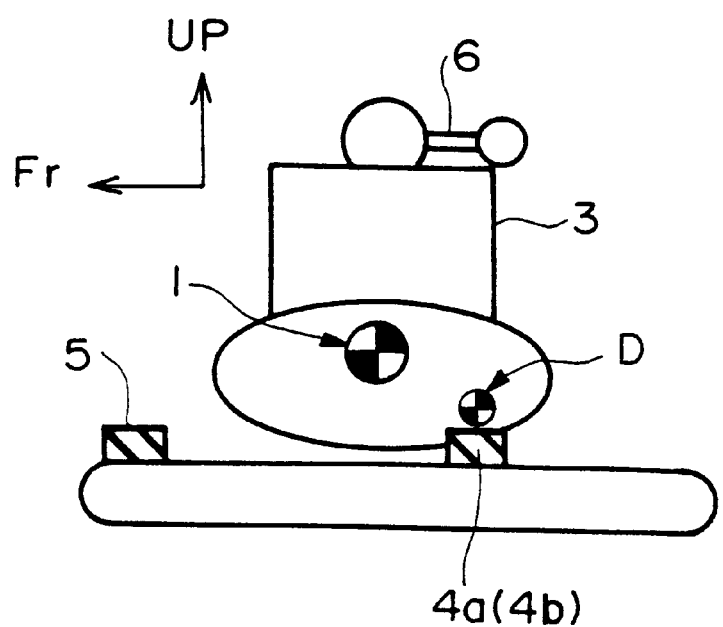
FIG. 12 is a side elevational view showing the suspension assembly for an automotive engine in accordance with the second embodiment of the invention.

An embodiment shown in FIGS. 11 and 12 is an example in which, in the case where a drive shaft D is located on the rear side of the vehicle after a resilient main axis E, engine mounts for supporting a static load of an engine are disposed on a vertical plane including a centerline D of each drive shaft. The same reference characters are used to designate the like members shown in the above-described first embodiment and explanation will be given as to differences therebetween.

In the second embodiment, main engine mounts 4a and 4b for supporting the static load of the engine 3 are disposed so that the support points (mount centers) are located just below the centerline D of each drive shaft. The main engine mounts 4a and 4b are located on the left side rail 1c and the right side rail 1d, respectively. This is very advantageous for the drivability in the case where a large torque is generated in the engine 3 when the vehicle is abruptly accelerated or decelerated, for example. This may make it possible to considerably reduce a shock feeling. The reason for this is that, in the case where a large torque is generated in the engine 3 as described above, the centerline D of each drive shaft is identified with the rolling axis and the working line (normal plane) of the force applied to the engine mounts 4a and 4b caused by the rolling motion of the engine 3 passes through a position in the vicinity of the gravity center G of the vehicle.

<Third Embodiment>

Figure 13:
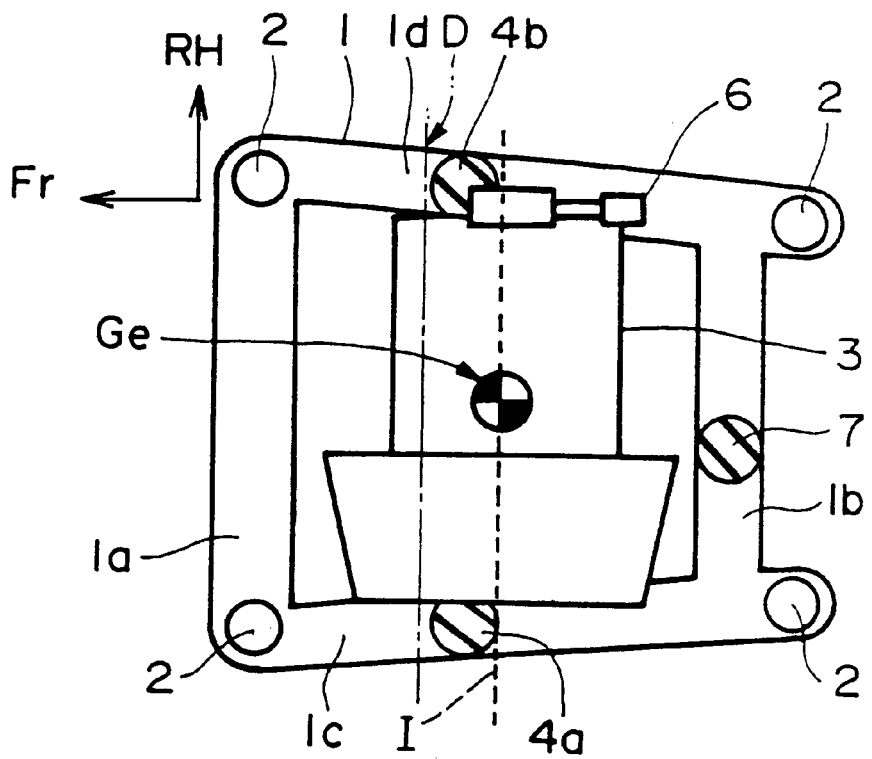
FIG. 13 is a plan view showing a suspension assembly for an automotive engine in accordance with a third embodiment of the invention.
Figure 14:
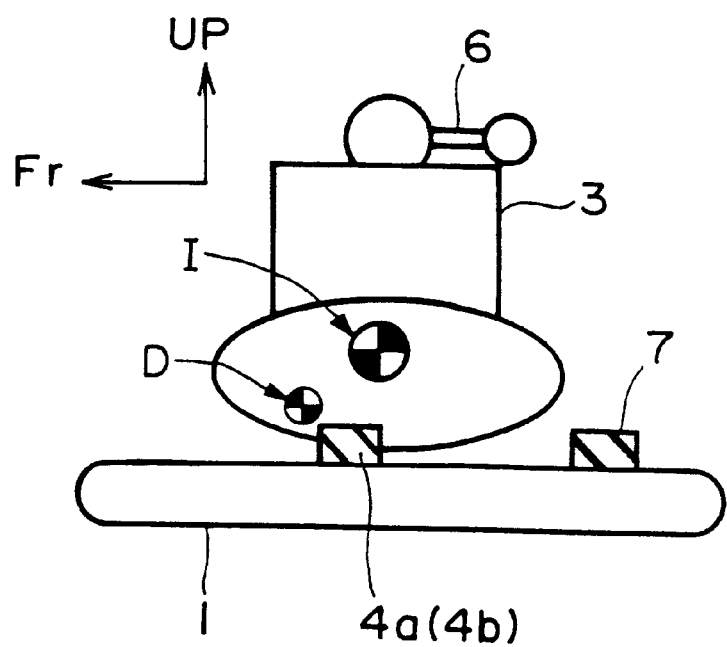
FIG. 14 is a side elevational view showing the suspension assembly for an automotive engine in accordance with the third embodiment of the invention.
Figure 15:
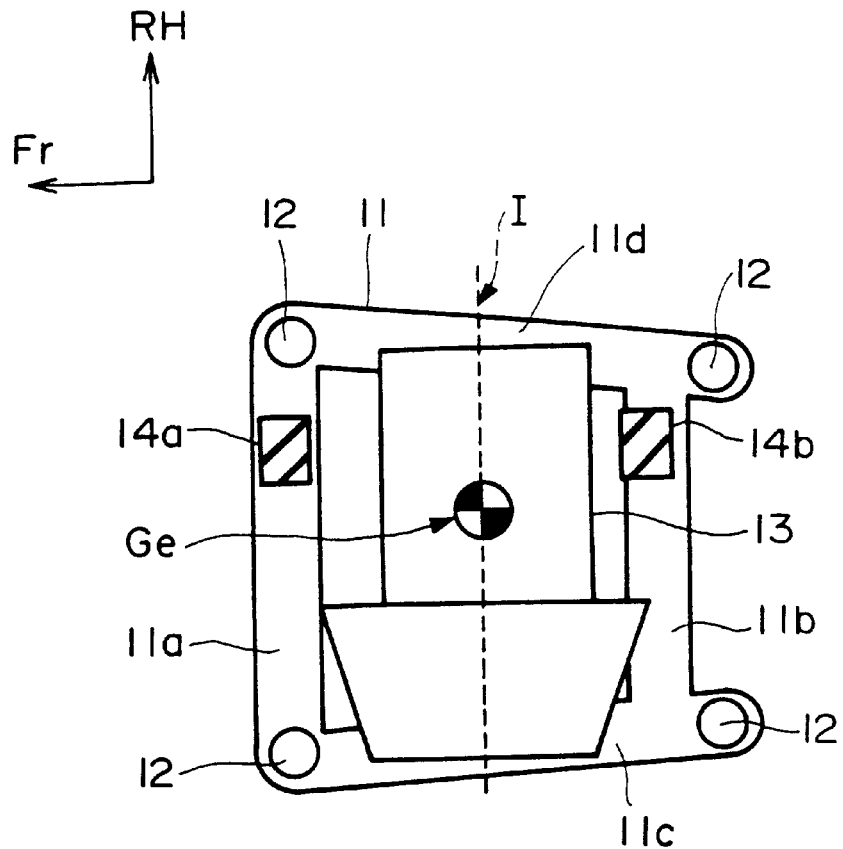
FIG. 15 is a plan view showing a conventional suspension assembly for an automotive engine.
Figure 16:
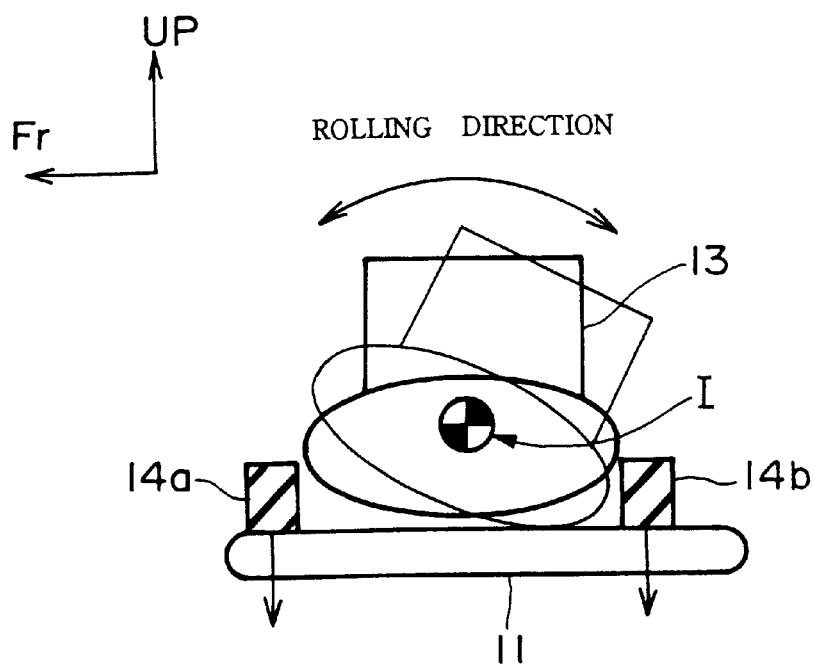
FIG. 16 is a side elevational view showing the conventional suspension assembly for an automotive engine.
Figure 17:
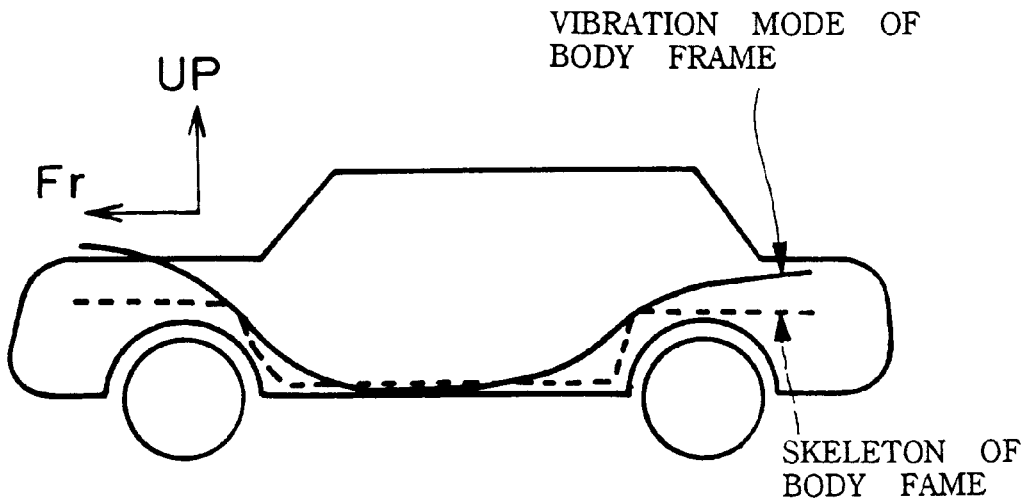
FIG. 17 is a view showing a vibration mode of body frame upon the idle vibration.

An embodiment shown in FIGS. 13 and 14 is an example in which, in the case where a drive shaft D is located on the front side of the vehicle before a resilient main axis E, engine mounts for supporting a static load of an engine are disposed in the vicinity of a vertical plane including a rolling inertia main axis I.

In this embodiment, the support points (mount centers) of the main engine mounts 4*a* and 4*b* are positioned slightly on the front side in the longitudinal direction of the vehicle before the vertical plane including the rolling inertia main axis I of the engine 3.

Also, in this embodiment, there is no front engine mount 5. Instead thereof, a rear engine mount 7 for preventing the engine 3 from slanting rearwardly is provided on the rear cross member 1*b*. The rear engine mount 7 is coupled with a rear portion of the engine 3 through a bracket (not shown).

Since the other structure is the same as that of the above-described first embodiment, the same reference numerals are used to indicate the like components and hence the explanation therefor has been omitted.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A suspension assembly for an automotive engine of a front-engine/front-drive vehicle and for supporting the engine to a frame by an engine mount wherein:

said engine mount is arranged in the vehicle in a range between a vertical plane including an inertia main axis in a rolling direction of the engine and a vertical plane including a centerline of a drive shaft;

said vertical plane including said inertia main axis is not included in said range; and said vertical plane including the centerline of said drive shaft is included in said range.

2. The suspension assembly for an automotive engine according to claim 1, wherein said engine mount for supporting a static load of the engine is disposed in said vertical plane including the centerline of said drive shaft.

* * * * *